United States Patent
Kim et al.

(10) Patent No.: US 12,285,983 B2
(45) Date of Patent: Apr. 29, 2025

(54) ROTARY DISC SUSPENSION SYSTEM

(71) Applicant: SYMBIOTIC, AGRI. INC., Gangwon-do (KR)

(72) Inventors: Bo Young Kim, Gangwon-do (KR); Toschetti Gian Maria, Gangwon-do (KR)

(73) Assignee: SYMBIOTIC, AGRI. INC., Gangwon-do (KR)

( * ) Notice: Subject to any disclaimer, the term of this patent is extended or adjusted under 35 U.S.C. 154(b) by 0 days.

(21) Appl. No.: 18/687,820

(22) PCT Filed: Nov. 22, 2021

(86) PCT No.: PCT/KR2021/017132
§ 371 (c)(1),
(2) Date: Feb. 29, 2024

(87) PCT Pub. No.: WO2023/033249
PCT Pub. Date: Mar. 9, 2023

(65) Prior Publication Data
US 2024/0383294 A1    Nov. 21, 2024

(30) Foreign Application Priority Data

Aug. 31, 2021  (KR) ........................ 10-2021-0115800

(51) Int. Cl.
*B60G 17/015*    (2006.01)
*B60G 99/00*    (2010.01)

(52) U.S. Cl.
CPC ........... *B60G 17/015* (2013.01); *B60G 99/00* (2013.01); *B60G 2206/10* (2013.01); *B60G 2500/30* (2013.01)

(58) Field of Classification Search
CPC .. B60G 17/015; B60G 99/00; B60G 2206/10; B60G 2500/30
See application file for complete search history.

(56) References Cited

U.S. PATENT DOCUMENTS

| | | | |
|---|---|---|---|
| 6,036,200 A | 3/2000 | Kim | |
| 10,363,787 B2* | 7/2019 | Hausmann | B60G 17/015 |
| 2021/0061284 A1* | 3/2021 | Ko | B60G 99/00 |

FOREIGN PATENT DOCUMENTS

| | | |
|---|---|---|
| JP | 2003-039911 A | 2/2003 |
| JP | 2009-196441 A | 9/2009 |

(Continued)

OTHER PUBLICATIONS

KR20100104671A Machine English Translation (Year: 2009).*

(Continued)

*Primary Examiner* — Jason D Shanske
*Assistant Examiner* — Matthew James O'Neill
(74) *Attorney, Agent, or Firm* — Revolution IP, PLLC

(57) ABSTRACT

The present invention relates to a rotary disc suspension system for connecting different components constituting a moving body, comprising: an inner disc rotatably connected to one component of the moving body; and an outer disc which is coupled to another component of the moving body and which is rotatably coupled to the inner disc while disposed to face the inner disc, and thus force applied to the moving body during traveling is converted into rotational motion from linear motion so that dynamic strain and dynamic stress of the moving body can be more actively managed, and thus, even if the moving body encounters bumpy and rugged land or sloped land when in motion, a horizontal state can be maintained without tilting.

7 Claims, 18 Drawing Sheets

(56) References Cited

FOREIGN PATENT DOCUMENTS

| | | | |
|---|---|---|---|
| KR | 100223123 B1 | * | 10/1997 |
| KR | 10-0194879 B1 | | 6/1999 |
| KR | 10-2010-0104671 A | | 9/2010 |
| KR | 20100104671 A | * | 9/2019 |

OTHER PUBLICATIONS

KR100223123 B1 Machine English Translation (Year: 1999).*
International Search Report for PCT/KR2021/017132 mailed May 11, 2022 from Korean Intellectual Property Office.

* cited by examiner

[Figure 1]
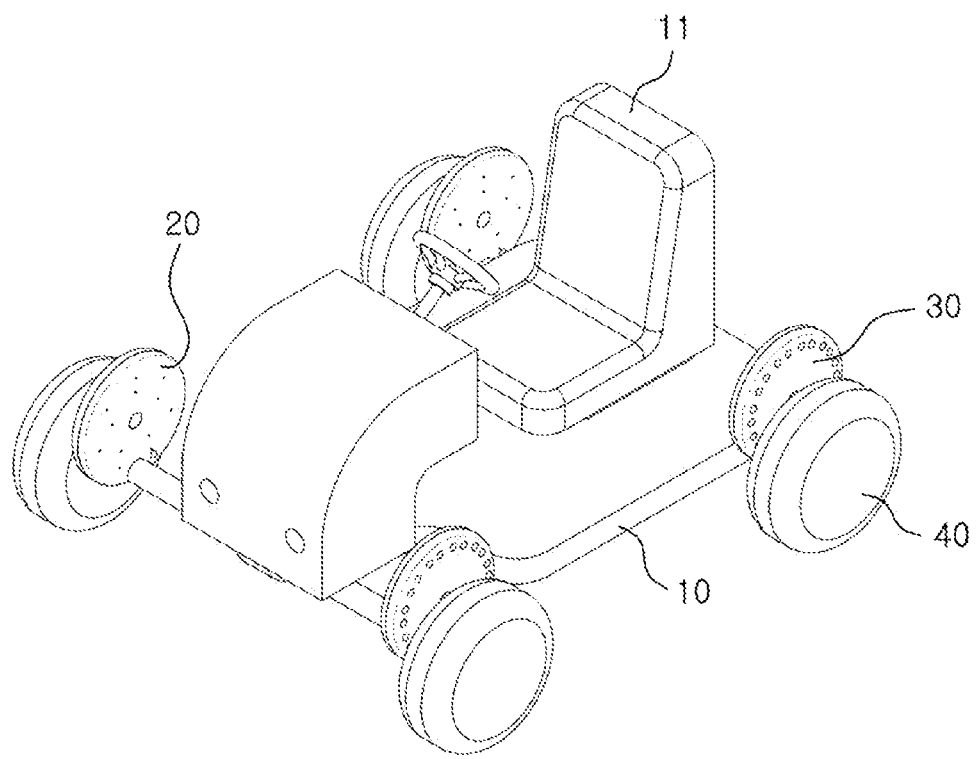

[Figure 2]
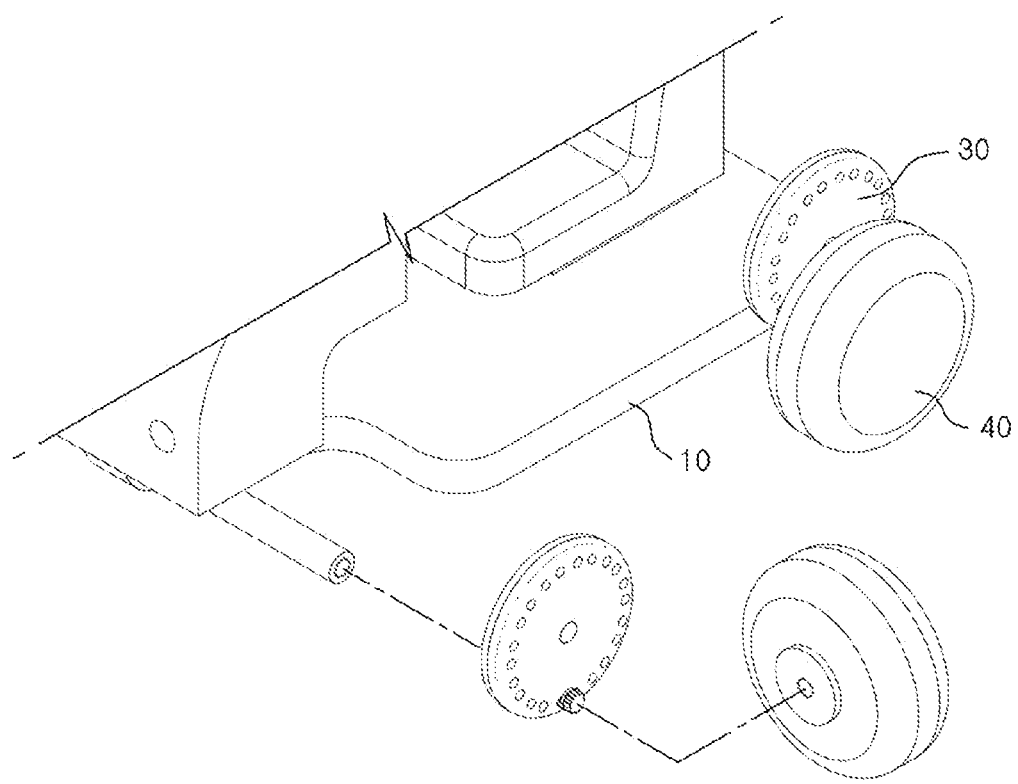

【Figure 3】
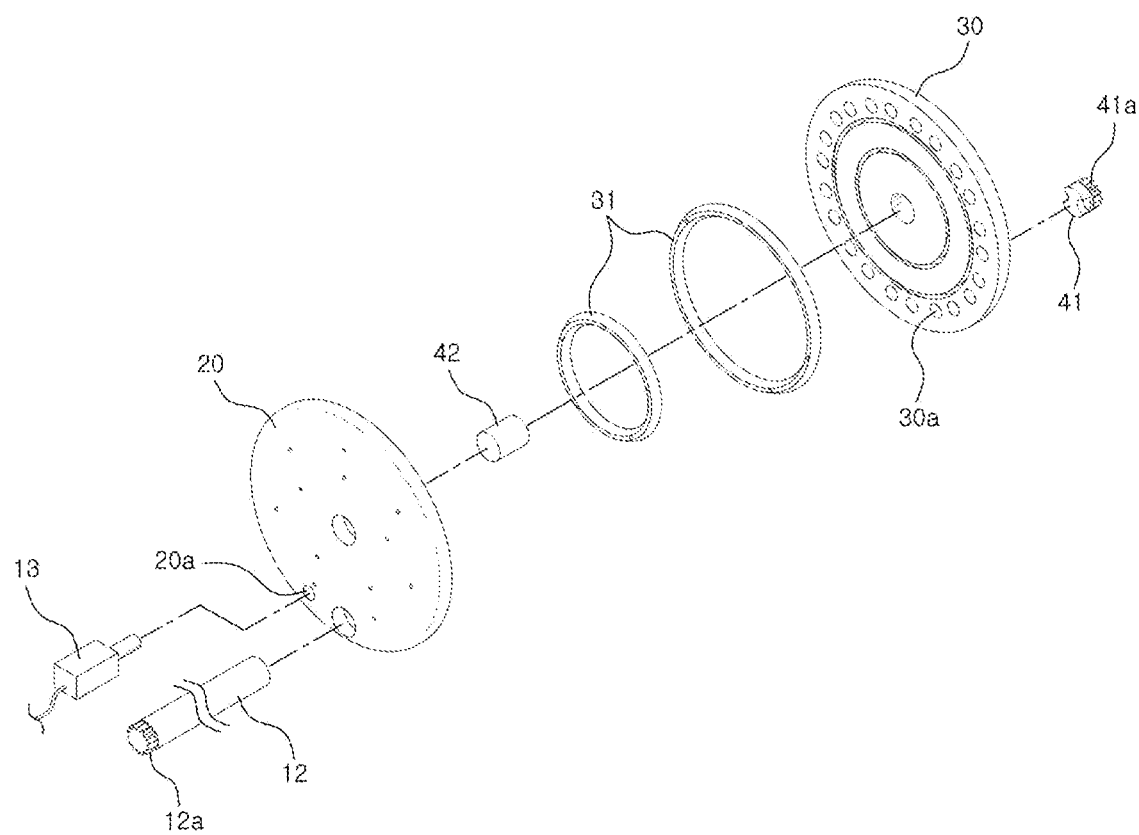

[Figure 4]
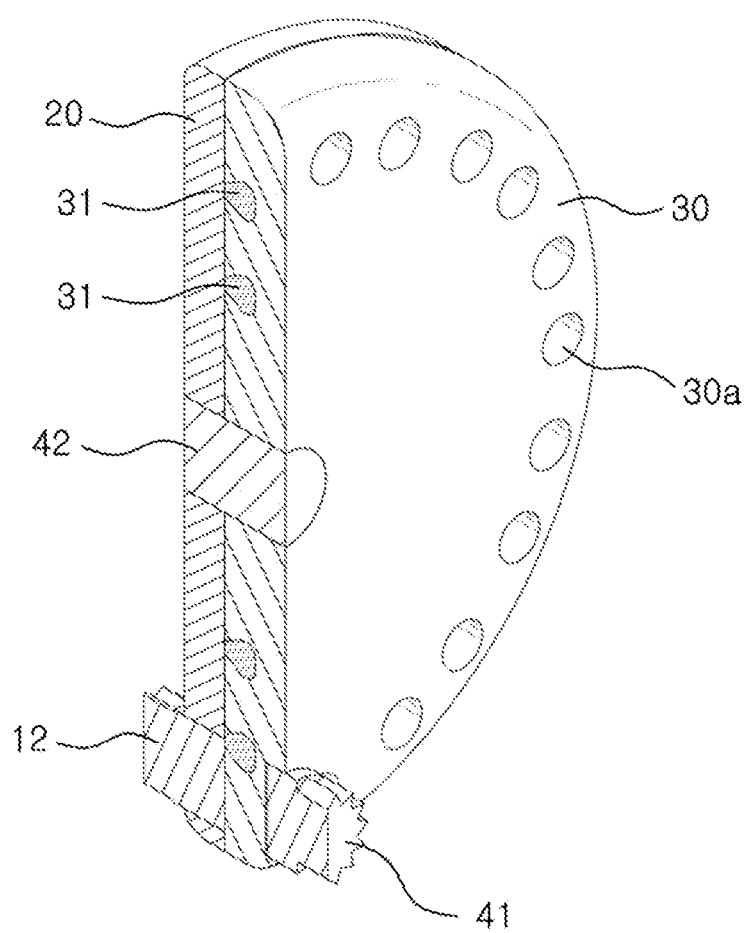

[Figure 5]
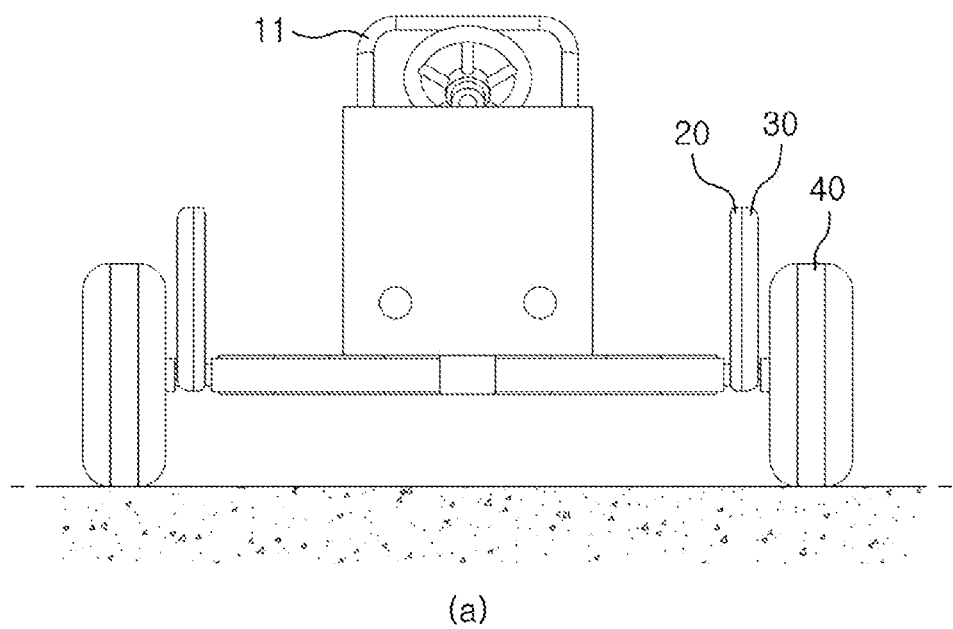
(a)
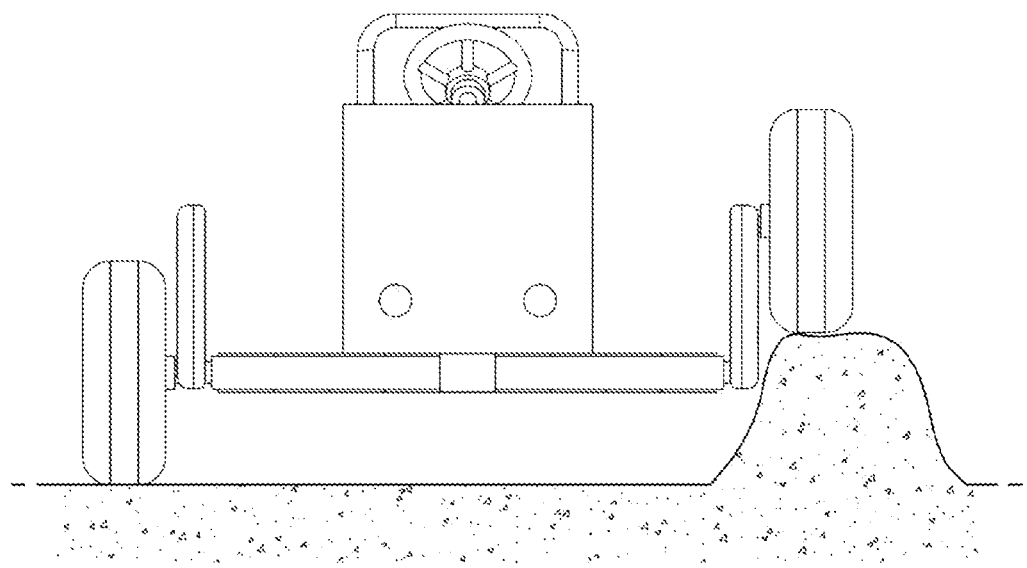
(b)

[Figure 6]
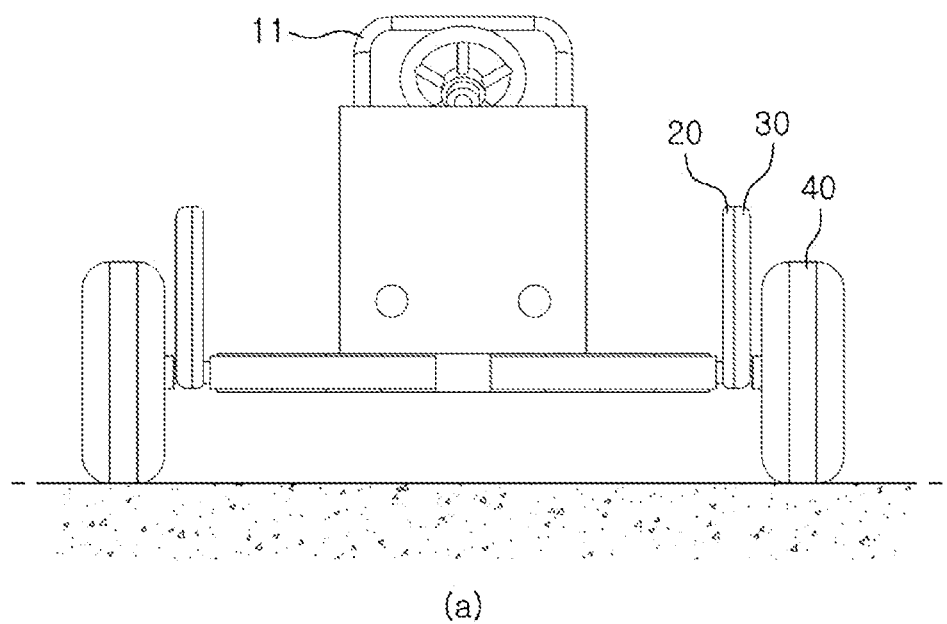
(a)
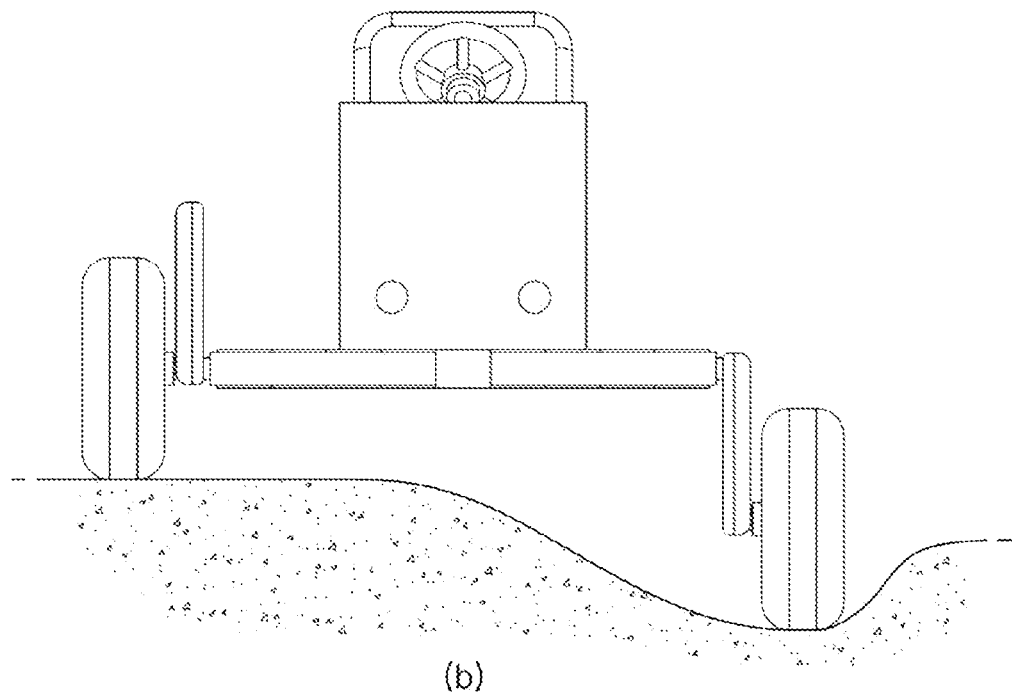
(b)

【Figure 7】
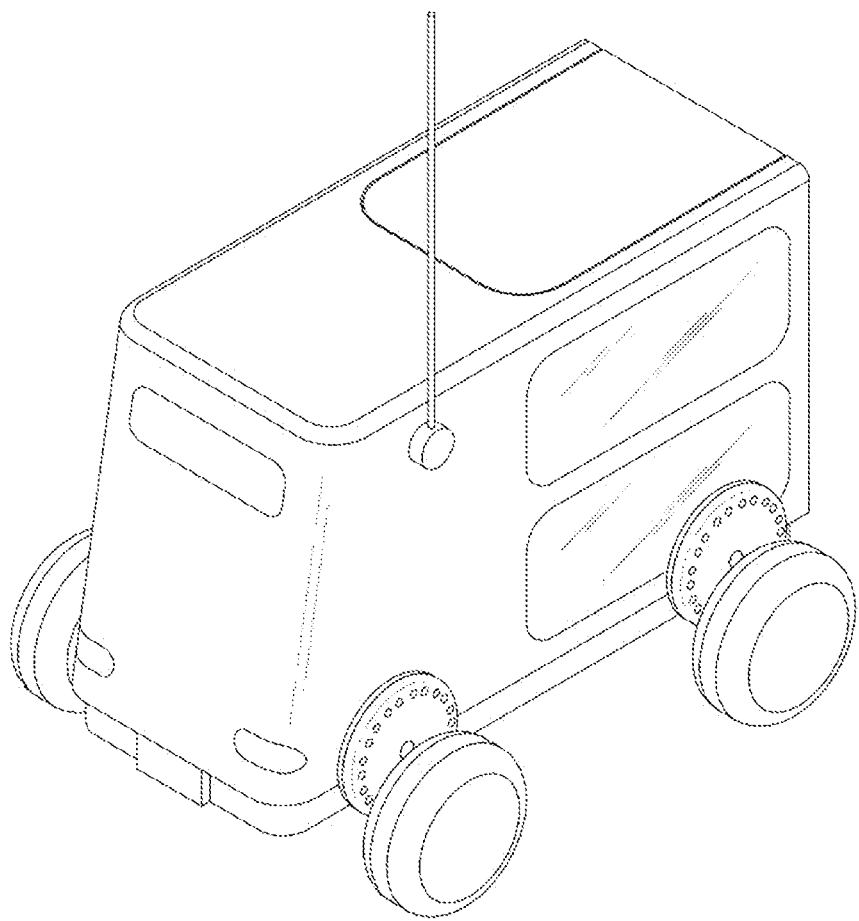

【Figure 8】
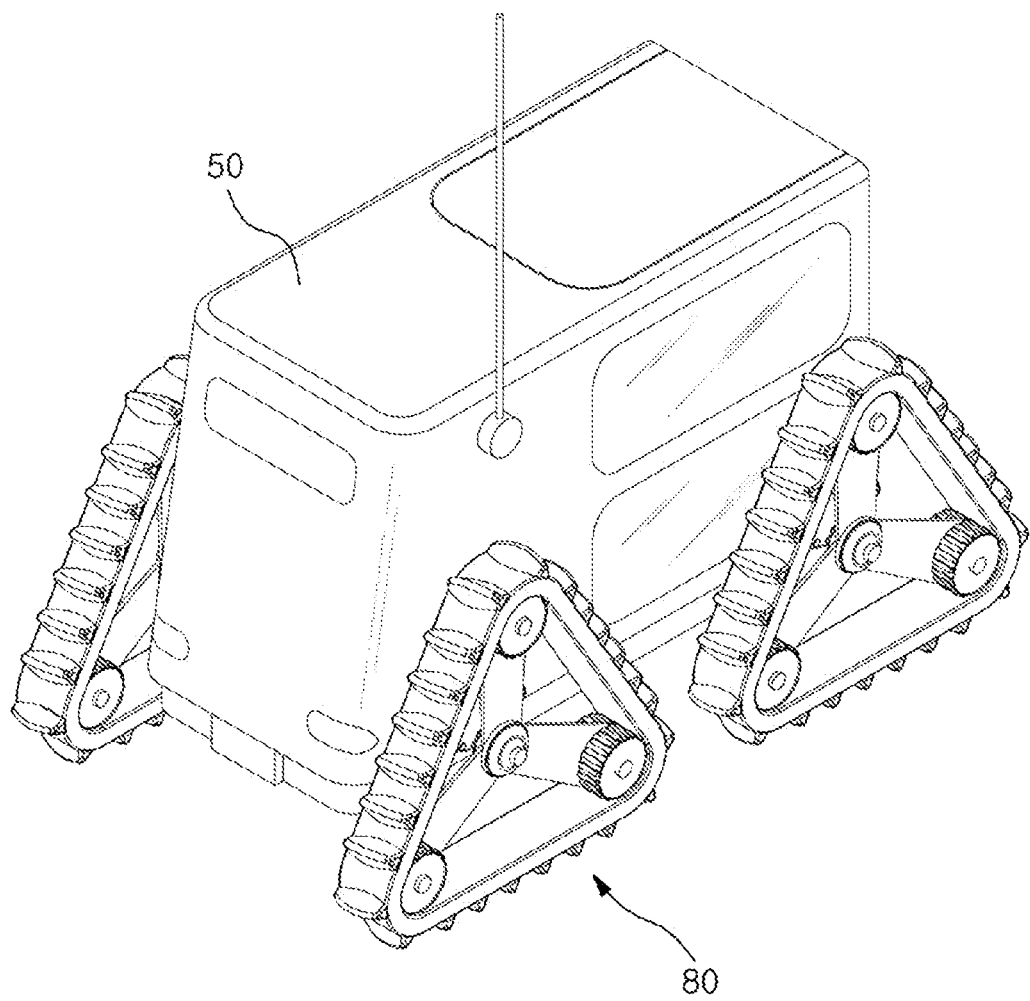

[Figure 9]
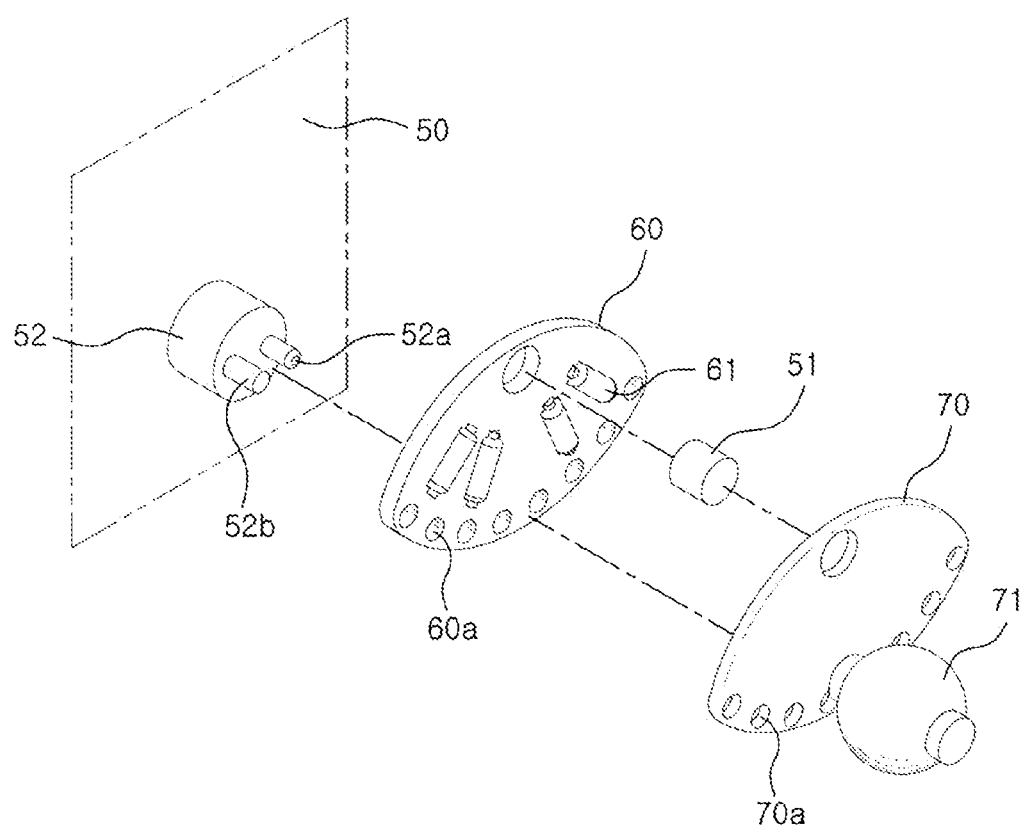

[Figure 10]
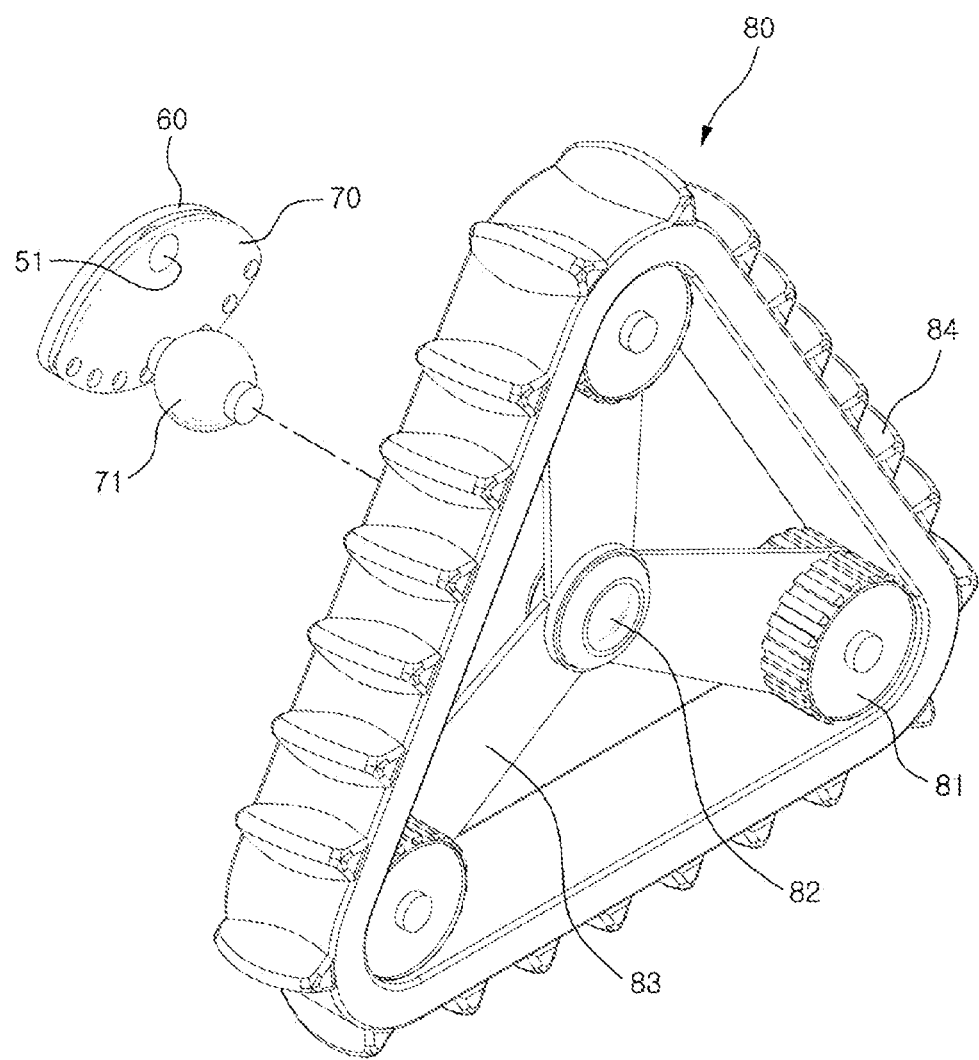

[Figure 11]
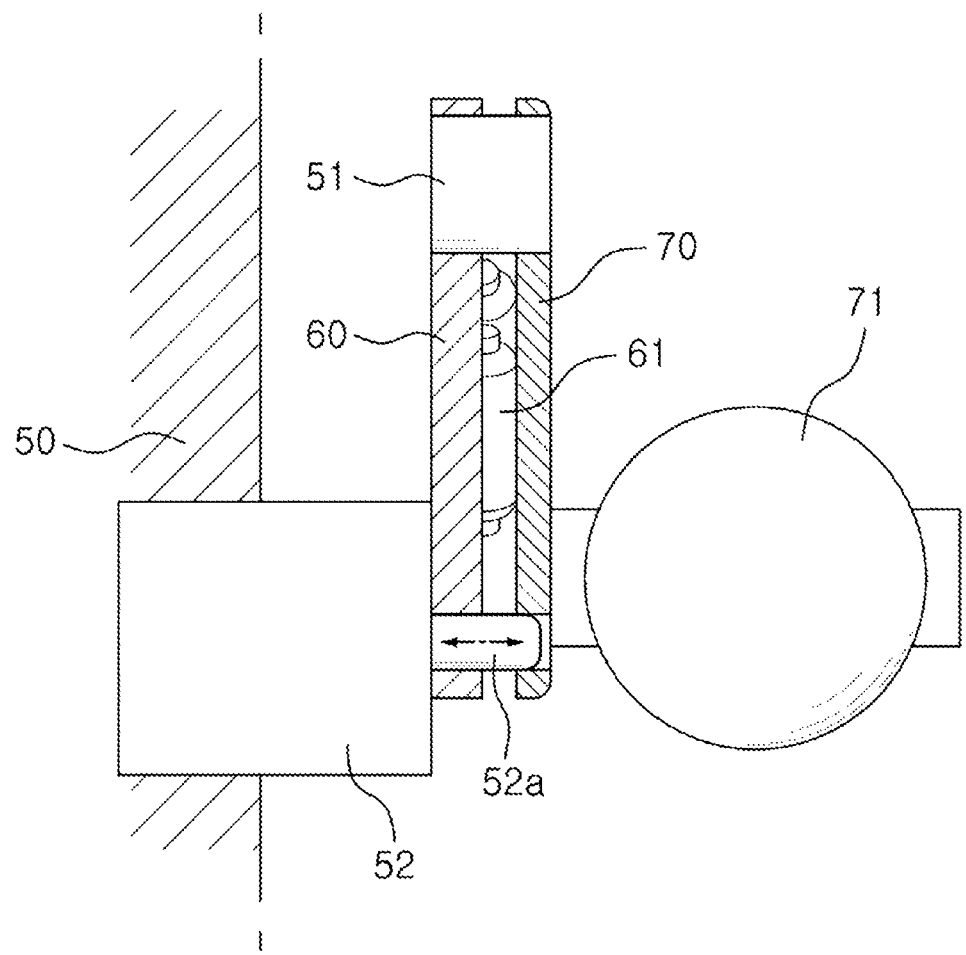

[Figure 12]
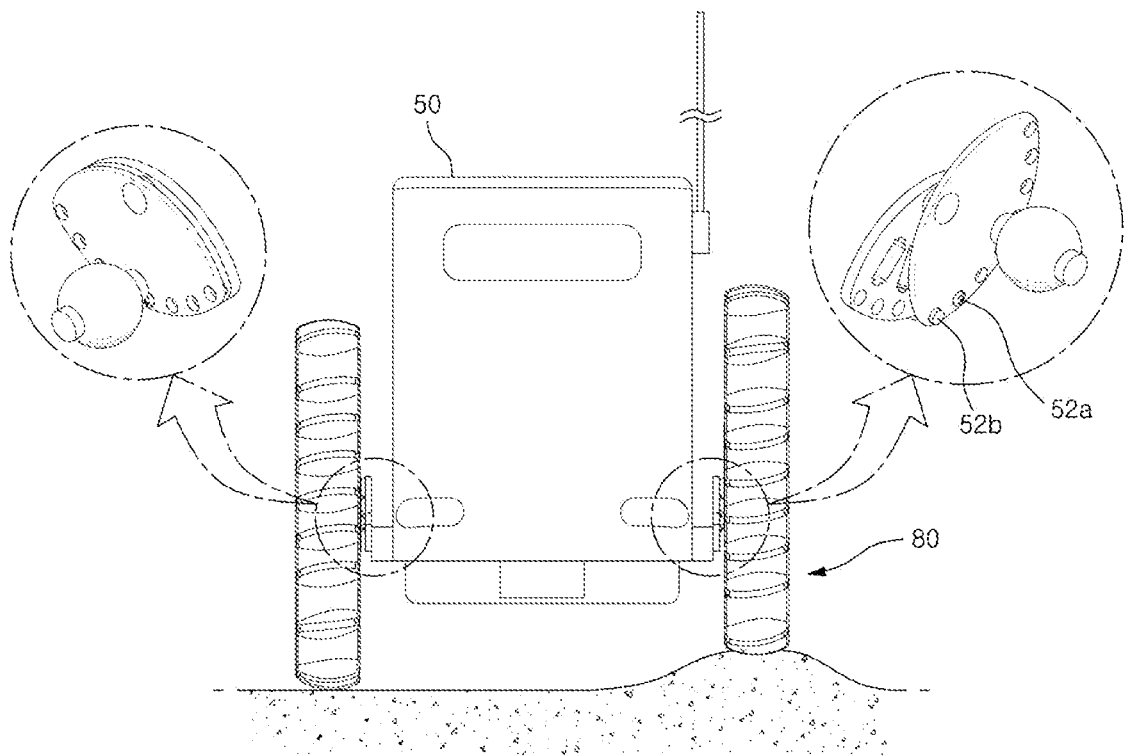

【Figure 13】
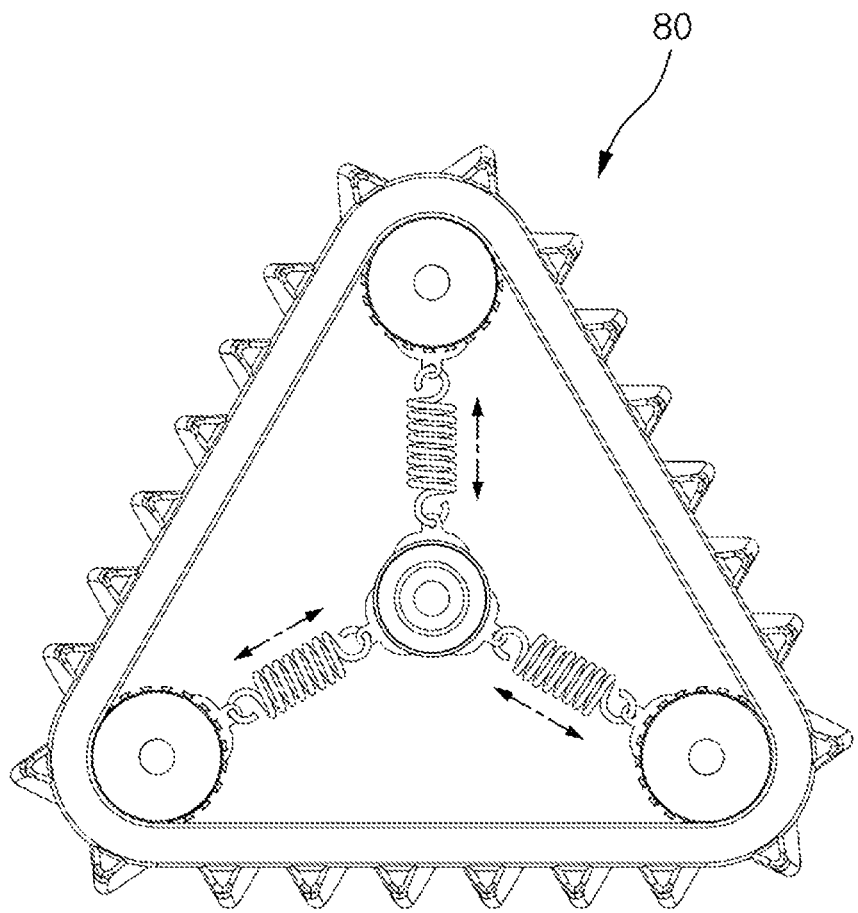

[Figure 14]
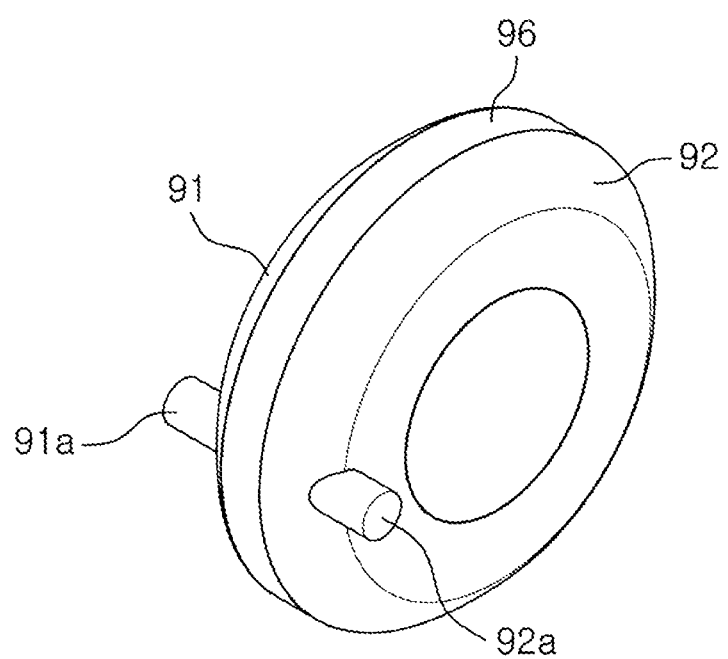

[Figure 15]
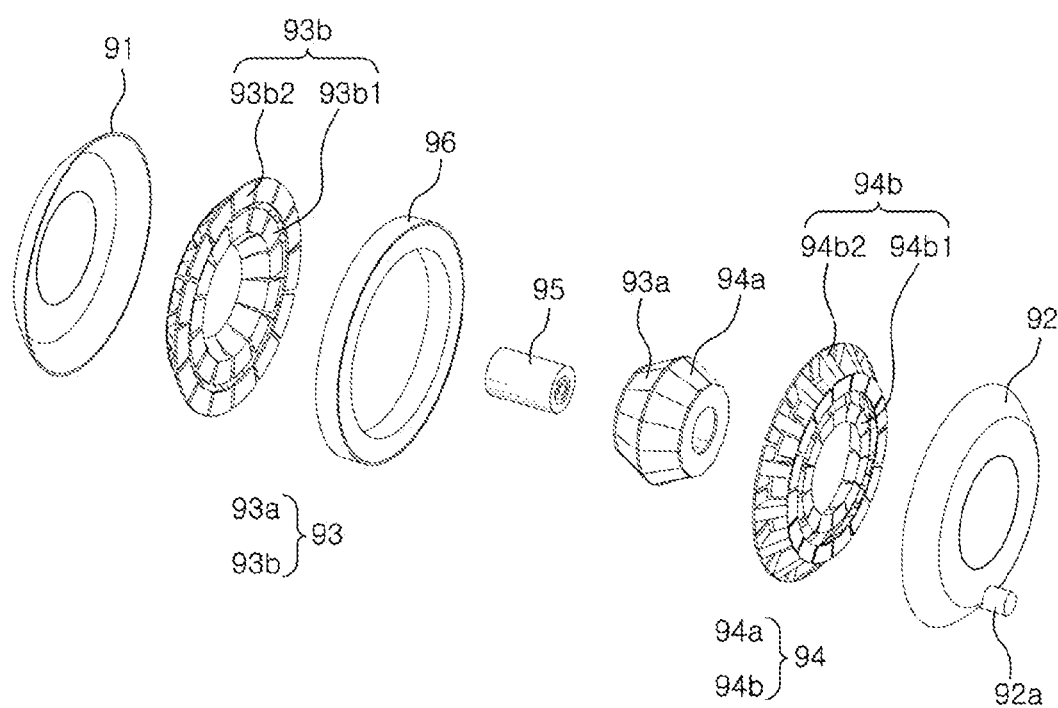

【Figure 16】
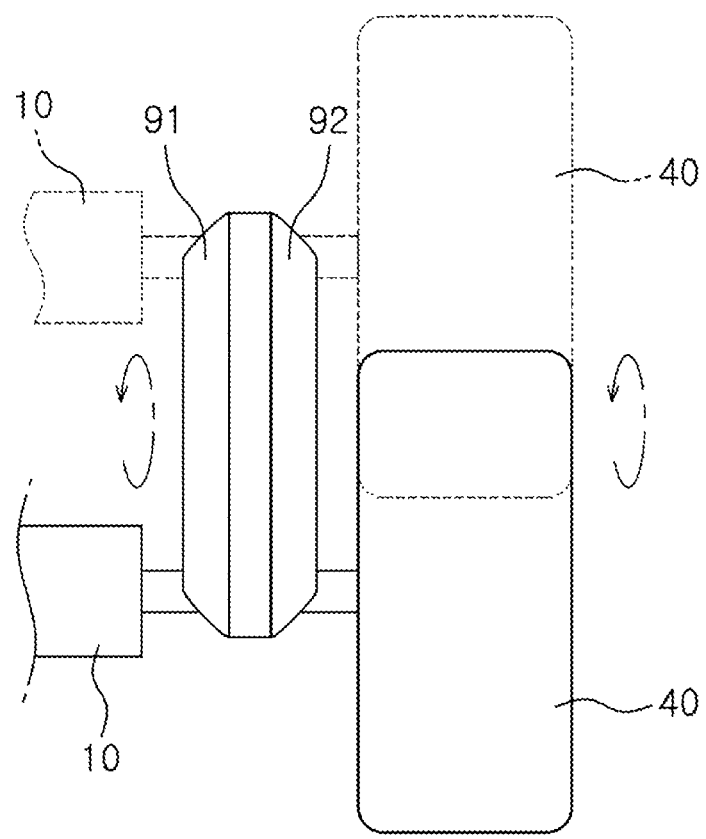

【Figure 17】
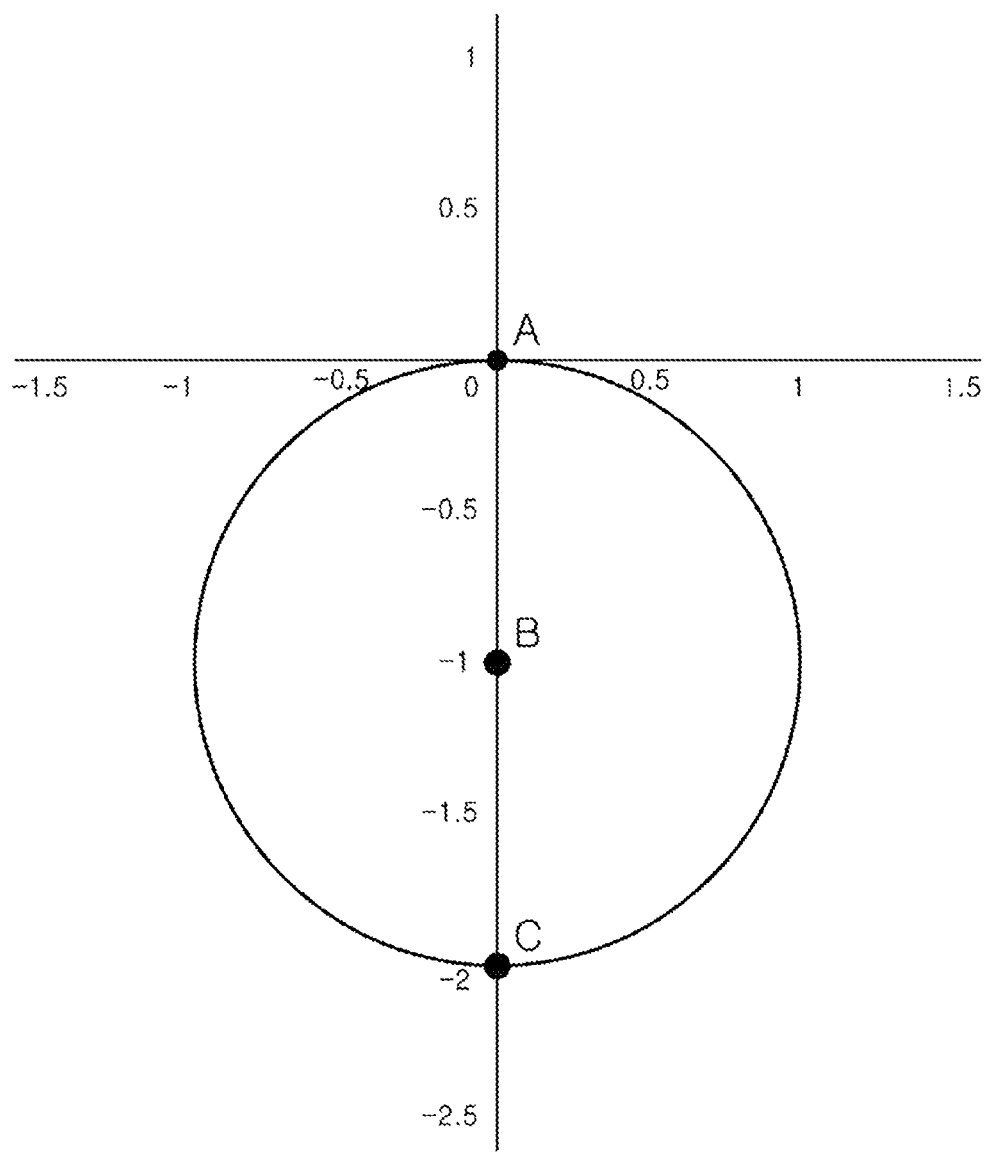

【Figure 18】
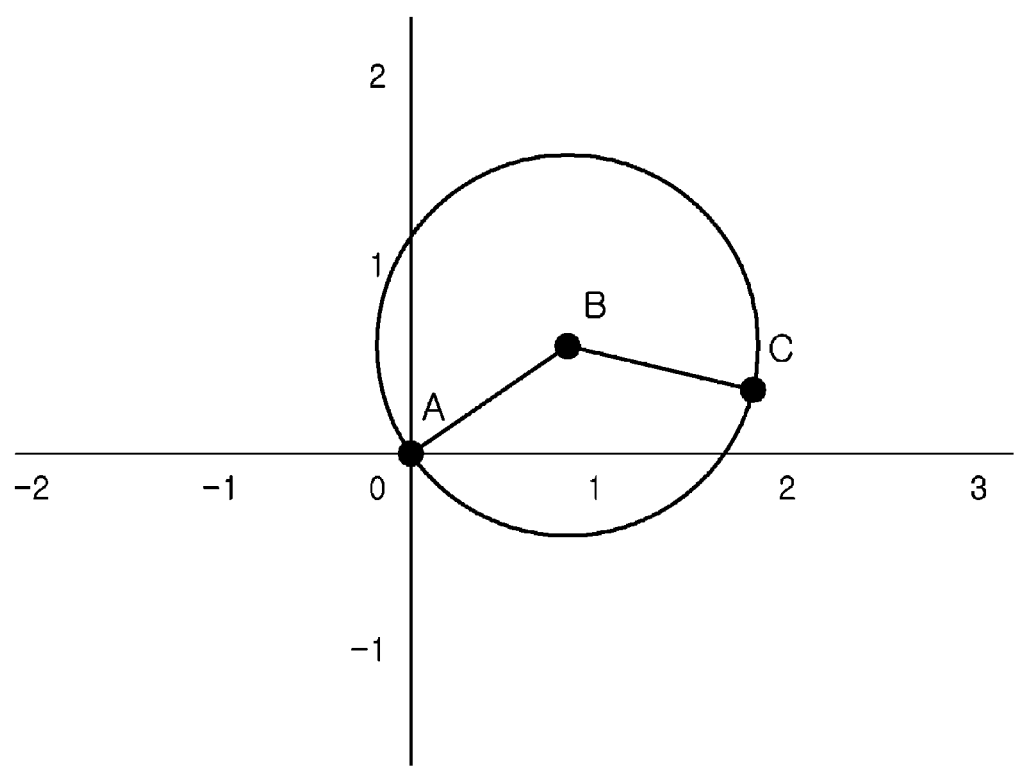

ROTARY DISC SUSPENSION SYSTEM

TECHNICAL FIELD

The present invention relates to a suspension system applied to moving devices such as vehicles, aircraft, and robots, and more specifically, to a rotary suspension system for maintaining the balance of a moving device even when the moving device moves on a curved surface, an inclined surface, or the like.

BACKGROUND ART

Typically, a suspension is a device for absorbing an impact to prevent the impact from a road surface from being transferred to a vehicle body or passengers, and shock absorbers, springs, and suspension arms are most commonly used.

Recently, as vehicles are widely used for various applications and travel on various terrains, technology for new types of suspensions for allowing vehicles to travel on uneven terrains is being developed.

Recreational vehicles or agricultural vehicles, commonly called mountain bikes, are transport vehicles used to transport materials or personnel in work environments in which it is difficult for regular vehicles to enter or travel, such as unpaved roads or mountainous terrains. Since these vehicles mainly travel on rough roads with many curves or slopes, a driver sitting in a device shakes severely, making it difficult to drive properly, and when loading and transporting materials, there may be a case in which the loaded materials fall out of the transport vehicle due to the device which shakes severely due to a roughness of the ground.

In addition, recently, as the spread of the new coronavirus leads to an "untact" society, a technology for delivering food to an orderer by serving robot a moving device for taking an order and delivering food in a restaurant is being commercialized, and furthermore, as ordering using a delivery app is becoming more popular, an autonomous driving delivery robot moving device for directly transporting goods from a store to the orderer's residence are being introduced.

However, a general robot moving device is shaken by a factor such as a change in height of the ground in a process of transporting food or goods, making it difficult to maintain the level of a carrier, and thus there is a problem in that food spills or the safe delivery of goods is hindered.

Therefore, there is a need to develop a technology for maintaining the horizontal posture of a vehicle body when a carrier for recreational vehicles, agricultural vehicles, delivery robots, and serving robots, as well as conventional vehicles travels on uneven surfaces such as curved or inclined surfaces.

DISCLOSURE

Technical Problem

The present invention has been devised to solve the problems of the related art and is directed to providing a rotary suspension system capable of achieving stable traveling by allowing a moving device, which maintains a horizontal state when traveling on a flat ground, to maintain the horizontal state without tilting even when the moving device encounters the bumpy ground.

Technical Solution

A rotary disc suspension system according to the present invention for achieving the object includes an inner disc rotatably coupled to a vehicle body, and an outer disc coupled to a wheel, disposed to face the inner disc, and rotatably coupled to the inner disc, wherein a linear motion of a force received by the vehicle is converted into a rotational motion.

Here, a support shaft connected to the vehicle body may be provided at an eccentric position of the inner disc, and a connection shaft connected to the wheel may be provided at an eccentric position of the outer disc.

In addition, a bearing may be installed between facing surfaces of the inner disc and the outer disc.

In addition, a braking unit configured to restrict rotation of each disc may be provided on the inner disc and the outer disc.

In addition, an actuator configured to provide a rotational force to each disc may be provided between the inner disc and the outer disc.

Specifically, the actuator may include an inner actuator provided at a side of the inner disc to provide a rotational force to the inner disc, and an outer actuator provided at a side of the outer disc to provide a rotational force to the outer disc.

Meanwhile, a rotary disc suspension system according to the present invention includes an inner disc rotatably connected to any one component of the moving device, and an outer disc coupled to the other component of the moving device, disposed to face the inner disc, and rotatably coupled to the inner disc, wherein a linear motion of a force received from the moving device is converted into a rotational motion.

Advantageous Effects

A rotary disc suspension according to the present invention can convert a linear motion of a force received by a moving device into a rotational motion while actively restricting the rolling of the moving device, and thus can be actively reacted with respect to dynamic strain and dynamic stress of the moving device.

When such a rotary suspension system is applied to a vehicle, the rotary suspension system is installed between a vehicle body and a wheel to adjust heights of the wheels and vehicle body as a disc rotates according to ground conditions, and thus the vehicle body can maintain the same horizontal state as when the vehicle travels on a flat ground without tilting even when the vehicle encounters a bumpy road or an inclined road during traveling.

In addition, since the suspension according to the present invention has a structure which absorbs an external force while a disc rotates, it is possible to significantly reduce an operating space as compared to a conventional piston type suspension for absorbing the external force with a linear vertical motion, thereby minimizing an installation space of the suspension in a vehicle.

In addition, since the conventional piston type suspension adjusts a fluid to move to each piston by a centralized pump to operate the all suspensions of the vehicle, there is a disadvantage in that while all of the suspensions cannot be operated due to a failure of any one suspension, since a rotary disc suspension according to the present invention does not require such a centralized system, there is an advantage in that it is possible to secure higher reliability and reduce costs in terms of maintenance.

DESCRIPTION OF DRAWINGS

FIGS. 1 and 2 are views illustrating a vehicle to which a rotary disc suspension system according to a first embodiment of the present invention is applied.

FIGS. 3 and 4 are views illustrating the rotary disc suspension system according to the present invention illustrated in FIG. 1.

FIG. 5 shows a view (A) illustrating a travelling state of the vehicle illustrated in FIG. 1 on a flat ground, and a view (B) illustrating a travelling state of the vehicle illustrated in FIG. 1 on an uphill terrain.

FIG. 6 shows a view (A) illustrating a travelling state of the vehicle illustrated in FIG. 1 on a flat ground, and a view (B) illustrating a travelling state of the vehicle illustrated in FIG. 1 on a downhill terrain.

FIG. 7 is a view illustrating a vehicle to which the rotary disc suspension system according to the first embodiment of the present invention is applied in an unmanned manner.

FIG. 8 is a view illustrating a vehicle to which a rotary disc suspension system according to a second embodiment of the present invention is applied.

FIG. 9 is a view illustrating the rotary disc suspension system according to the present invention illustrated in FIG. 8.

FIG. 10 is a view illustrating a state in which the rotary disc suspension system according to the present invention illustrated in FIG. 8 is coupled to an endless track.

FIG. 11 is a side cross-sectional view illustrating the rotary disc suspension system according to the present invention illustrated in FIG. 8.

FIG. 12 is a view illustrating a travelling state of the vehicle illustrated in FIG. 8 on an uphill terrain.

FIG. 13 is a view illustrating a state of a support of the vehicle illustrated in FIG. 8 that is a spring.

FIG. 14 is a view illustrating a coupled state of a rotary disc suspension system according to a third embodiment of the present invention.

FIG. 15 is a view illustrating a disassembled state of the rotary disc suspension system according to the third embodiment of the present invention.

FIG. 16 is a view illustrating an operating state of the rotary disc suspension system according to the third embodiment of the present invention.

FIGS. 17 and 18 illustrate the movement of inner and outer discs in the rotary disc suspension system according to the present invention on an X-Y plane, in which FIG. 17 is a view illustrating positions of the inner and outer discs in a reference state (origin state), and FIG. 18 is a view illustrating specific positions of the inner and outer discs moving to predetermined levels from the reference state.

MODES OF THE INVENTION

A rotary disc suspension system according to the present invention for solving the problems includes an inner disc rotatably coupled to a vehicle body, and an outer disc coupled to a wheel, disposed to face the inner disc, and rotatably coupled to the inner disc and converts a linear motion of a force received by a vehicle into a rotational motion.

In addition, the rotary disc suspension system according to the present invention may include an inner disc rotatably connected to any one component of a moving device, and an outer disc coupled to another component of the moving device, disposed to face the inner disc, and rotatable coupled to the inner disc and convert a linear motion of a force received by the moving device to a rotational motion.

The rotary disc suspension system according to the present invention connects different components constituting a moving device such as a vehicle or a robot to convert a linear motion of the force received by the moving device to a rotational motion. Such a suspension has two rotatably coupled discs disposed to concentrically face each other. In this case, the first disc (inner disc) is rotatably connected to any one component (first component) of the moving device, and the second disc (outer disc) is rotatably connected to the other component (second component) of the moving device. In this case, each component of the moving device is eccentrically connected to the first and second discs, that is, is connected at a position which deviates from a central axis of the first and second discs. Therefore, since the first and second discs rotate while following a change in height (positions) of the first and second discs even when the moving device travels on a bumpy ground, it is possible to maintain balance between the first and second components, thereby maintaining the balancing of the entirety of the moving device.

Here, the rotary disc suspension is preferably applied to a component which moves up and down while supporting a weight of the moving device when the moving device moves. For example, the rotary disc suspension can be applied to portions of leg joints of a robot or portions in which a vehicle body and wheels of a vehicle are connected.

Hereinafter, in describing the rotary disc suspension according to the present invention, for convenience of description, an example of a suspension system applied to a vehicle among moving devices will be described.

When the rotary disc suspension according to the present invention is applied to the vehicle, a component (e.g., a vehicle body frame or a suspension keel) connected to the first disc (inner disc) is a component provided at the vehicle body side, and a component connected to the second disc (outer disc) is a component (e.g., a wheel hub) provided at the wheel side.

Hereinafter, embodiments in which the rotary disc suspension system according to the present invention is applied to the vehicle will be described in detail with reference to the accompanying drawings.

FIGS. 1 and 2 are views illustrating a vehicle to which a rotary disc suspension system according to a first embodiment of the present invention is applied, and FIGS. 3 and 4 are views illustrating the rotary disc suspension system according to the present invention illustrated in FIG. 1.

In addition, FIG. 5A is a view illustrating a travelling state of the vehicle illustrated in FIG. 1 on a flat ground, and FIG. 5B is a view illustrating a travelling state of the vehicle illustrated in FIG. 1 on an uphill terrain, and FIG. 6A is a view illustrating a travelling state of the vehicle illustrated in FIG. 1 on a flat ground, and FIG. 6B is a view illustrating a travelling state of the vehicle illustrated in FIG. 1 on a downhill terrain.

In addition, FIG. 7 is a view illustrating a vehicle to which the rotary disc suspension system according to the first embodiment of the present invention is applied in an unmanned manner.

A suspension with a vehicle body balancing function according to a first embodiment of the present invention includes an inner disc 20 installed at a side of a vehicle body 10, and an outer disc 30 installed outside the inner disc 20 to face the inner disc 20. The outer disc 30 is configured to be coupled to a side of a wheel 40.

The vehicle body 10 is a portion constituting a basic frame of the vehicle and has an upper surface provided with a seat 11 on which a driver sits. A support shaft 12 to be described below will be connected to the vehicle body 10.

The support shaft 12 is provided at an eccentric position of the inner disc 20. In other words, the support shaft 12 is provided at a position separated outward from a central portion of the inner disc 20. The support shaft 12 has an outer circumferential surface provided with sawteeth 12a, and a portion at which the sawteeth 12a are formed is inserted into the vehicle body 10.

In addition, serrated holes having a shape corresponding to the sawteeth 12a formed on the support shaft 12 is connected to a side surface of the vehicle body 10, and the support shaft 12 is inserted into the serrated holes. Therefore, the support shaft 12 does not rotate in the vehicle body 10.

As the inner disc 20 and the outer disc 30 are respectively connected to the vehicle body 10 and the wheel 40 and are rotatably installed to independently rotate according to a ground state, while the wheel 40 is changed in level, the vehicle body performs a function of a gimbal suspension of which a horizontal state is maintained.

The inner disc 20 is formed in a disc shape with a predetermined thickness and may rotate about the support shaft 12 while having an edge through which the support shaft 12 passes.

As described above, the support shaft 12 has a portion at which the sawteeth 12a are formed at one side of the outer circumferential surface thereof and the remaining portions in which the sawteeth 12a are not formed, and the portions in which the sawteeth 12a are not formed are formed in a cylindrical shape to pass through an eccentric point of the inner disc 20. Therefore, the inner disc 20 may rotate about the support shaft 12.

In addition, the inner disc 20 has one insertion hole 20a formed at an edge thereof. The insertion hole 20a is a space into which a sliding pin 13 to be described below will be inserted.

The outer disc 30 is formed in a disc shape with a predetermined thickness, may have a central portion through which a central pin 42 passing through the central portion of the inner disc 20 passes, and rotate about the central pin 42.

In other words, the cylindrical central pin 42 passes through the central portion of the inner disc 20 and at the same time, passes through the central portion of the outer disc 30, and the inner disc 20 and the outer disc 30 may independently rotate about the central pin 42. For example, when the inner disc 20 rotates clockwise about the central pin 42, the outer disc 30 may rotate clockwise or counter-clockwise.

A bearing 31 is installed by being inserted into a surface of the outer disc 30 facing the inner disc 20.

More specifically, one side surface of the outer disc 30 and one side surface of the inner disc 20 are installed in surface contact with each other, and in such a state, when the inner disc 20 and the outer disc 30 relatively perform rotational motions, friction is generated at contact surfaces of the inner disc 20 and the outer disc 30. Therefore, in the present invention, the bearing 31 is installed on the outer disc 30 to eliminate such friction.

In addition, the inner disc 20 and the outer disc 30 are each provided with a braking unit for restricting the rotation of the discs 20 and 30. The braking unit may restrict the rotation of each disc by inserting a pin into each hole formed at corresponding positions of the inner disc 20 and the outer disc 30.

To this end, the outer disc 30 has a plurality of communication holes 30a formed at regular intervals along the edge thereof. The communication hole 30a communicates with the insertion hole 20a formed in the inner disc 20.

The sliding pin 13 is connected to the vehicle body 10 side, and the sliding pin 13 operates according to an electrical signal to enter and exit the insertion hole 20a of the inner disc 20 and the communication hole 30a of the outer disc 30. When the sliding pin 13 enters the insertion hole 20a and the communication hole 30a, the inner disc 20 and the outer disc 30 are integrated to prevent the outer disc 30 from relatively moving with respect to the inner disc 30. Here, the electrical signal is a signal transmitted from a controller to the sliding pin 13 based on terrain information during traveling acquired through a position recognition system, such as an inertial measurement unit (IMU), for supervising the balance of the entirety of the vehicle.

When the vehicle to which the rotary disc suspension according to the present invention is applied passes a non-bumpy ground such as a flat ground, there is no need for relative rotation of the inner disc 20 and the outer disc 30, and thus in this case, the sliding pin 13 enters the insertion hole 20a and the communication hole 30a.

A connection shaft 41 rotatably installed at the edge, that is, the eccentric position of the outer disc 30 is coupled to the wheel 40.

More specifically, the connection shaft 41 has a portion at which the sawteeth 41a are formed at one side of the outer circumferential surface thereof and the remaining portions in which the sawteeth 41a are not formed. The portions in which the sawteeth are not formed are formed in a cylindrical shape and inserted into the eccentric point of the outer disc 30. In addition, the portion at which the sawteeth 41a are formed is connected to the wheel 40 portion.

Therefore, when the wheel 40 passes the bumpy ground and moves up, the connection shaft 41 is pulled by the wheel 40 and moves up along with the wheel 40, and the outer disc 30 is rotated about the central pin 42 connected to the central portion by an upward movement force.

Meanwhile, the wheel 40 is provided with a power device therein and rotates with its own power. In other words, the wheel 40 generates a rotational force by itself and is rotated by the force (so-called "tire engine") rather than a manner in which a separate engine is provided on the vehicle body 10 to receive a rotational force from the engine so that the wheel 40 rotates.

The vehicle to which the disc suspension according to the present invention is applied can be applied not only to manned vehicles which may be directly driven by people, but also to unmanned autonomous driving vehicles which are provided with various sensors capable of recognizing nearby objects and a global positioning system (GPS) so that the transport vehicles travel by themself.

When the disc suspension is applied to the autonomous driving vehicles, a shape of the vehicle body can be designed in various ways depending on the purpose of use, such as food delivery or goods delivery. For example, in the case of transporting or delivering goods, it is preferable to secure a space in which goods are loaded therein by forming an upper portion of the vehicle body 10 in a box shape as illustrated in FIG. 7.

An operating process of the vehicle to which the rotary disc suspension according to the present invention configured as described above is applied is briefly described as follows.

When the vehicle travels on a flat ground and passes an uphill ground with one side raised high (see FIG. 5), the wheels 40 travels along the uphill ground while rotating, and the connection shaft 41 is pulled by the wheels 40 to move upward while rotating along with the wheels 40.

At the same time, the outer disc 30 is pulled by the connection shaft 41 to rotate about the central pin 42. At this time, the inner disc 20 maintains a state (horizontal state of the vehicle body) in which the vehicle travels on the flat ground without rotation.

At this time, the sliding pin 13 inserted into the insertion hole 20a and the communication hole 30a when the vehicle travels on the flat ground should come out of the communication hole 30a before the vehicle enters an uphill terrain. At this time, the terrain information during traveling acquired through the positioning recognition system, such as an IMU, for supervising the balance of the entirety of the vehicle is continuously transmitted to a control unit, and the control unit receiving this signal allows the sliding pin 13 to be inserted into the insertion hole 20a and the communication hole 30a or allows the sliding pin 13 inserted into the insertion hole 20a and the communication hole 30a to come out of the communication hole 30a according to a terrain state.

In addition, when the vehicle travels on a flat ground and then travels on a downhill ground with one side recessed (see FIG. 6), the wheels 40 moves downward along with the connection shaft 41 while rotating about the connection shaft 41.

A force of the connection shaft 41 moving downward at the same time is provided to the outer disc 30 and the inner disc 20 to allow the inner disc 20 to rotate downward about the support shaft 12, and at this time, the inner disc 30 rotates along with the outer disc 30 integrated by the central pin 42.

Of course, at this time, the sliding pin 13 inserted into the insertion hole 20a and the communication hole 30a when the vehicle travels on the flat ground should come out of the insertion hole 20a and the communication hole 30a before the vehicle enters the downhill terrain.

As described above, when the vehicle travels on the flat ground and ten travels on the uphill ground with one side raised high or the downhill ground with one side recessed, the vehicle body 10 of the vehicle according to the present invention can maintain the same horizontal state as when the vehicle travels on the flat ground without tilting to any one side.

The rotary disc suspension according to the first embodiment of the present invention has been described above with reference to FIGS. 1 to 7, and hereinafter, a rotary disc suspension according to a second embodiment of the present invention will be described with reference to FIGS. 8 to 12.

FIG. 8 is a view illustrating a vehicle to which a rotary disc suspension system according to a second embodiment of the present invention is applied, FIG. 9 is a view illustrating the rotary disc suspension system according to the present invention illustrated in FIG. 8, and FIG. 10 is a view illustrating a state in which the rotary disc suspension system according to the present invention illustrated in FIG. 8 is coupled to an endless track.

In addition, FIG. 11 is a side cross-sectional view illustrating the rotary disc suspension system according to the present invention illustrated in FIG. 8, and FIG. 12 is a view illustrating a travelling state of the vehicle illustrated in FIG. 8 on an uphill terrain.

The suspension with the vehicle body balancing function according to the second embodiment of the present invention illustrated in FIGS. 8 to 12 includes an inner disc 60 installed on a vehicle body 50, and an outer disc 70 disposed on an outer surface of the inner disc 60 to face the inner disc 60. Here, the outer disc 70 is coupled to a wheel side. In FIGS. 8 to 12, although the wheels of the vehicle are illustrated as endless tracks 80, the present invention is not limited thereto, and the disc suspension is also applied to wheels in the form of general circular tires as in the above-described embodiment.

The vehicle body 50 is provided with a space for storing objects, and a support shaft 52 to be described below is connected to each of both front side ends and both rear side ends. The support shaft 52 is provided with a support pin 52b and a sliding pin 52a.

The support pin 52b may be installed to pass through the inner disc 60, and the inner disc 60 may rotate about the support pin 52b. Describing in more detail with reference to FIGS. 9 and 11, one end of the support shaft 52 is connected to the vehicle body 50, and the other end is connected to the inner disc 60. The outer disc 70 is formed with a communication hole 70a into which the sliding pin 52a is inserted to slide in a front-rear direction. In this case, the rotation of the outer disc 70 is restricted when the outer disc 70 is constrained by the sliding pin 52a, and when the sliding pin 52a comes out of the insertion hole 70a of the outer disc 70 according to ground situations, the outer disc 70 may rotate. In summary, the support pin 52b is coupled to the vehicle body and serves as a rotational axis of the inner disc 60, and the sliding pin 52a serves to restrict the relative rotation of the outer disc 70 with respect to the inner disc 60.

The inner disc 60 is formed as an arc-shaped mold plate with a predetermined thickness, has an upper central portion through which a central pin 51 passes, and is connected to the outer disc 70.

A bearing 61 is installed by being inserted into a surface of the inner disc 60 facing the outer disc 70.

More specifically, one side surface of the inner disc 60 and one side surface of the outer disc 70 are installed in surface contact with each other, and in such a state, when the inner disc 60 and the outer disc 70 relatively perform rotational motions, friction is generated at contact surfaces of the inner disc 60 and the outer disc 70. Therefore, in the present invention, the bearing 61 is installed on the inner disc 60 to eliminate such friction. It goes without saying that the bearing 61 may be installed on the outer disc 70.

In addition, the inner disc 60 has a plurality of insertion holes 60a formed at a lower edge thereof at regular intervals. The insertion hole 60a is a space into which a sliding pin 52 is inserted.

The outer disc 70 has the same shape as the inner disc 60, has an upper central portion through which the central pin 51 passes, and rotates about the central pin 51.

The outer disc 70 is provided so that a spherical connection shaft 71 protrudes toward the endless track 80 from a lower central portion thereof.

In addition, the outer disc 70 has a plurality of communication holes 70a formed at a lower edge thereof at regular intervals. The communication hole 70a communicates with the insertion hole 60a formed in the inner disc 60.

A sliding pin 52a is connected to the vehicle body 50, and the sliding pin 52a operates according to an electrical signal to enter and exit the insertion hole 60a of the inner disc 60 and the communication hole 70a of the outer disc 70. When the sliding pin 52a enters the insertion hole 60a and the communication hole 70a, the inner disc 60 and the outer disc 70 are integrated to prevent the relative rotation of the outer disc 70 with respect to the inner disc 60.

When the vehicle to which the rotary disc suspension according to the present invention is applied passes a non-bumpy ground such as a flat ground, there is no need for relative rotation of the inner disc 60 and the outer disc 70, and thus in this case, the sliding pin 52a enters the insertion hole 60a and the communication hole 70a.

The connection shaft 71 of the outer disc 70 is rotatably inserted into a central portion of an endless track 80.

The endless track 80 includes a plurality of sprockets 81, a center cap 82 disposed at the center of the plurality of sprockets 81, a support 83 of which one end is connected to the plurality of sprockets 81 and the other end is connected to the center cap 82, and a track belt 84 surrounding the plurality of sprockets 81.

The plurality of sprockets 81 are disposed in a triangular shape.

The center cap 82 has the connection shaft 71 of the outer disc 70 rotatably inserted therein.

The support 83 maintains an arrangement state of the sprockets 81 disposed in a triangular shape and may be configured in the form of a link, but configured as a spring (see FIG. 13) or a shock absorber. When the support 83 is configured as a spring or a shock absorber, an impact occurring during traveling can be better absorbed.

An operating process of the vehicle to which the rotary disc suspension according to the present invention configured as described above is applied is briefly described as follows.

When the vehicle travels on a flat ground, the inner disc 60 and the outer disc 70 are supported by the central pin 51 to maintain a state in which facing surfaces are in contact with each other. When the vehicle travels on the flat ground as described above, the sliding pin 52a maintains a state of being inserted into the insertion hole 60a of the inner disc 60 and the communication hole 70a of the outer disc 70.

When the vehicle travels on the flat ground and then travels on an uphill ground with one side raised high (see FIG. 12), the endless track 80 rides on the uphill ground, and the outer disc 70 rotates about the central pin 51. At this time, the inner disc 60 does not rotate on the central pin 51 and maintains a state of traveling on the flat ground.

Here, the sliding pin 52a inserted into the insertion hole 60a and the communication hole 70a when the vehicle travels on the flat ground comes out of the communication hole 70a before the vehicle enters an uphill terrain.

At this time, terrain information during traveling acquired through the positioning recognition system, such as an IMU, for supervising the balance of the entirety of the vehicle is continuously transmitted to a control unit, and the control unit receiving this signal allows the sliding pin 52a to be inserted into the insertion hole 60a and the communication hole 70a or allows the sliding pin 52a inserted into the insertion hole 60a and the communication hole 70a to come out of the insertion hole 60a and the communication hole 70a according to a terrain state.

Next, a rotary disc suspension system according to a third embodiment of the present invention will be described. The rotary disc suspension system according to the third embodiment of the present invention differs from those of the first and second embodiments in that a driving unit (actuator) for rotating the inner and outer discs is built-in.

FIG. 14 is a view illustrating a coupled state of a rotary disc suspension system according to a third embodiment of the present invention, FIG. 15 is a view illustrating a disassembled state of the rotary disc suspension system according to the third embodiment of the present invention, and FIG. 16 is a view illustrating an operating state of the rotary disc suspension system according to the third embodiment of the present invention.

Referring to FIGS. 14 to 16, the disc suspension system according to the third embodiment of the present invention includes an inner disc 91 coupled to a side of a vehicle body, an outer disc 92 coupled to a side of a wheel, and actuators 93 and 94 provided between the inner and outer discs 91 and 92 to provide a rotational force to each of the discs 91 and 92.

A support shaft 91a coupled to the side of the vehicle body is provided at an outer edge of the inner disc 91, that is, an eccentric position of the inner disc 91. A connection shaft 92a coupled to the wheel side is also provided at an outer edge of the outer disc 92. Therefore, as upper and lower positions of the support shaft 91a and connection shaft 92a provided on the discs 91 and 92 are changed along edges of the discs 91 and 92 upon rotation of the inner and/or outer discs 91 and 92, heights of the wheel and the vehicle body are also changed.

The actuator is a power device built-in the disc to provide a rotational force to each of the discs 91 and 92. The actuator is composed of an inner actuator 93 in charge of rotation of the inner disc 91 and an outer actuator 94 in charge of rotation of the outer disc 92. The inner and outer actuators 93 and 94 have the same configuration and are symmetrically disposed with respect to the center between the inner and outer discs 91 and 92. Therefore, the inner disc 91 and the outer disc 92 may rotate independently.

The inner and outer actuators 93 and 94 are composed of stators 93a and 94a and rotors 93b and 94b, which are connected to the discs 91 and 92.

The stators 93a and 94a are configured in a conical disc shape with an open central portion and have a permanent magnet mounted therein.

The rotors 93b and 94b are disposed to surround the entireties of the stators 93a and 94a in a ring shape. In the rotors 93b and 94b, an electromagnet set 93b1 and 94b1 formed of a plurality of electromagnets is each mounted on an inner surface of each of ring bodies 93b2 and 94b2.

The inner and outer discs 91 and 92 are connected to the assigned rotors 93b and 94b. Therefore, rotational forces of the rotors 93b and 94b may be transmitted to the discs 91 and 92.

Meanwhile, a central pin 95 and a centering 96 for guiding rotation of the discs 91 and 92 are installed between the inner and outer discs 91 and 92.

The central pin 95 may be installed to pass through the centers of the stators 93a and 94a and the rotors 93b and 94b and may have both ends connected to the inner and outer discs 91 and 92 to guide the rotation of the inner and outer discs 91 and 92.

The centering 96 is installed to surround the rotors 93b and 94b between the inner and outer discs 91 and 92. Since rubber is disposed in close contact with the inside of the centering 96, the rotation of the centering 96 is restricted. In other words, the centering 96 is a non-rotation component.

Therefore, a rotational force is not transmitted between the inner and outer discs 91 and 92 by the centering 96. In other words, even when the inner disc 91 rotates, the outer disc 92 is not rotated by the centering 96. In other words, even when the inner disc 92 rotates, the outer disc 91 is not rotated by the centering 96. It goes without saying that the discs 91 and 92 may be independently rotated by the assigned actuators 93 and 94 about the centering 96.

At this time, when the inner and outer discs 91 and 92 rotate in the same direction, all suspensions rotate without change in positions of the wheel and the vehicle, and when the inner and outer discs 91 and 92 rotate in opposite directions, the vehicle may be moved up or down due to the buffering effect of each disc. Meanwhile, the actuators 93 and 94 may fix the discs 91 and 92, respectively, using an electromagnetic brake (braking unit).

In the disc suspension system with the above-described configuration, when power is supplied to the rotors 93b and 94b, electromagnetic forces are generated to rotate the rotors 93b and 94b about the stators 93a and 94a. Since the rotors 93b and 94b are connected to the discs 91 and 92, the discs 91 and 92 also rotate as the rotors 93b and 94b rotate. At this time, the power supply to the rotors 93b and 94b is controlled based on the terrain information during traveling acquired through the position recognition system, such as an IMU, for supervising the balance of the entirety of the vehicle.

As illustrated in FIG. 16, the disc suspension system according to the third embodiment with the above-described configuration can more actively respond to a change in height of the ground according to various terrains by allowing the inner and outer discs to rotate by themselves by the actuators.

FIGS. 17 and 18 illustrate the movement of inner and outer discs according to the present invention on an X-Y plane, in which FIG. 17 is a view illustrating positions of the inner and outer discs in a reference state (origin state), and FIG. 18 is a view illustrating specific positions of the inner and outer discs moving to predetermined levels from the reference state.

The core technical principle of the rotary disc suspension according to the present invention is to convert the linear motion of the force applied to the vehicle body through the wheels to the rotational motion by the rotating discs.

Such a rotational operation of the disc will be described in more detail with reference to FIGS. 17 and 18.

First, point "A" is a portion at which the inner disc is connected to a frame of the vehicle body and is illustrated as reference coordinates, which become the basis for position movement of the disc, that is, origin coordinates (0.0).

Next, point "C" is a portion at which the outer disc is connected to a wheel hub of the wheel, and a position (coordinates) of the point is moved by the rotation of the outer disc.

In addition, point "B" is a portion at which the centers of the outer disc and the inner disc are connected, and a position (coordinates) of the point is moved by the rotation of the inner disc. Here, the positions (coordinates) of points "B" and "C" are determined by an equation using a trigonometric function below.

$$B(r \cos \theta_B; r \sin \theta_B), C(r \cos \theta_B + R \cos \theta_C; r \sin \theta_B + R \sin \theta_C)$$ [Equation]

(here, $\theta_B$ denotes an angle formed by a straight line passing point A and point B and a Y-axis using point A as a coordinate axis, and $\theta_C$ denotes an angle formed by a straight line passing point B and point C and a Y-axis using point B as a coordinate axis. r denotes a radius ($\overline{AB}$) of the inner disc, and R denotes a radius ($\overline{BC}$) of the outer disc).

As described above, positions of the device and the wheel perform the rotational motion along a trajectory of a circumference according to Equation by the rotation of the inner and outer discs.

Specifically, as the radius ($\overline{AB}$) of the inner disc rotates about the point connected to the device frame along the circumference, the position of point "B" with respect to the device frame is specified by Equation ($x_b$; $y_b$).

In addition, as the radius ($\overline{BC}$) of the outer disc rotates about the point connected to the inner disc at the center, the position of point "C" with respect to the device frame is specified by Equation ($x_c$; $y_c$).

Regarding the rotational motion of the above-described rotary disc suspension, describing the disc suspension of the first embodiment with reference to FIG. 3, the support shaft 12 of the inner disc 20 is point "A," the central pin 42 is point "B," and the connection shaft 41 of the outer disc 30 is point "C." Here, a position of the central pin 42 (point B) to which the centers of the inner disc 20 and the outer disc 30 are connected is changed in a circumferential direction about the support shaft 12 (point A), and a position of the connection shaft 41 (point B) of the outer disc 30 is changed in the circumferential direction about the central pin 42 (point B). Such a change in position caused by the rotational motion of the disc is also applied to the remaining embodiments in the same manner.

The disc rotary suspension according to the present invention with the above-described configuration can actively distribute forces coming from various obstacles that the vehicle encounters during traveling, balance physical forces due to a high speed or heavy load, and actively move the central mass to operate safely on slopes.

Although exemplary embodiments of the present invention have been illustrated and described above, the present invention is not limited to the above-described specific embodiments, and it goes without saying that the present invention can be modified variously by those skilled in the art to which the present invention pertains without departing from the gist of the present invention claimed by the claims, and these modifications belong to the claims of the present invention.

INDUSTRIAL APPLICABILITY

Since the disc rotary suspension has a deep industrial/technological connection with work vehicles and leisure vehicles used to transport materials or personnel in environments in which it is difficult for general vehicles to enter or operate, such as unpaved roads or mountainous terrain, the disc rotary suspension can be widely used in these industries.

The invention claimed is:

1. A rotary disc suspension system that is applied to a vehicle, comprising:
   an inner disc rotatably coupled to a vehicle body; and
   an outer disc coupled to a wheel, disposed to face the inner disc, and rotatably coupled to the inner disc,
   wherein a support shaft connected to the vehicle body is provided at an eccentric position of the inner disc, and a connection shaft connected to the wheel is provided at an eccentric position of the outer disc,
   wherein the inter disc and the outer disc independently rotate about a central pin that penetrates a central portion of the inner disc and simultaneously penetrates a central portion of the outer disc, and
   wherein in response to the inner disc rotating clockwise about the central pin, the outer disc rotates clockwise or counterclockwise.

2. The rotary disc suspension system of claim 1, wherein a bearing is installed between facing surfaces of the inner disc and the outer disc.

3. The rotary disc suspension system of claim 1, wherein a braking unit configured to restrict rotation of each disc is provided on each of the inner disc and the outer disc.

4. The rotary disc suspension system of claim 1, further comprising an actuator connected to each of the inner disc and the outer disc to provide a rotational force to each disc.

5. The rotary disc suspension system of claim 4, wherein the actuator includes an inner actuator provided at a side of the inner disc to provide a rotational force to the inner disc, and an outer actuator provided at a side of the outer disc to provide a rotational force to the outer disc.

6. A rotary disc suspension system for connecting different components constituting a moving device, comprising:
    an inner disc rotatably connected to any one component of the moving device; and
    an outer disc coupled to another component of the moving device, disposed to face the inner disc, and rotatably coupled to the inner disc,
    wherein the inter disc and the outer disc independently rotate about a central pin that penetrates a central portion of the inner disc and simultaneously penetrates a central portion of the outer disc, and
    wherein in response to the inner disc rotating clockwise about the central pin, the outer disc rotates clockwise or counterclockwise.

7. A rotary disc suspension system applied to a vehicle, comprising:
    a disc coupled to a wheel of the vehicle to rotate by itself; and
    an actuator connected to the disc to provide a rotational force of the disc,
    wherein a support shaft connected to a vehicle body or the wheel is provided at an eccentric position of the disc to allow a height of the vehicle body or the wheel to be changed according to rotation of the disc,
    wherein the disc comprises:
        an inner disc rotatably coupled to the vehicle body, and
        an outer disc coupled to the wheel, disposed to face the inner disc and rotatably coupled to the inner disc,
    wherein the inter disc and the outer disc independently rotate about a central pin that penetrates a central portion of the inner disc and simultaneously penetrates a central portion of the outer disc, and
    wherein in response to the inner disc rotating clockwise about the central pin, the outer disc rotates clockwise or counterclockwise.

* * * * *